United States Patent Office 3,754,025
Patented Aug. 21, 1973

3,754,025
PRODUCTION OF ORGANIC ACIDS
Bertram Yeomans, Hessle, England, assignor to
BP Chemicals Limited, London, England
No Drawing. Filed Dec. 15, 1970, Ser. No. 98,473
Claims priority, application Great Britain, Dec. 19, 1969,
61,918/69
Int. Cl. C07c 51/14, 51/00
U.S. Cl. 260—533 R     17 Claims

ABSTRACT OF THE DISCLOSURE

In the production of di-neo acids from an olefin having two diisoalkyl groups separated by not less than 3 carbon atoms and formic acid, or CO and a mineral or Lewis acid, the yield based on diisoalkyl olefin may be increased by feeding other olefins of defined structure.

---

The present invention relates to the production of di-neo carboxylic acids.

It is disclosed in U.S. Pat. 2,864,858 that dicarboxylic acids may be made by the reaction of a saturated paraffin having two tertiary hydrogen atoms with carbon monoxide in the presence of an olefin acting substance and a strong acid. It is stated that it is important to avoid the reaction of the olefin with carbon monoxide, and that his may be done by conrolling the pressure of the carbon monoxide.

British Pat. 1,120,714 discloses that mono-neo acids may be made by the reaction of an olefin with formic acid and sulphuric acid.

It is disclosed in co-pending U.S. application Ser. No. 835,778 that di-neo acids may be produced by reaction of an olefin which is an α-ω-di-isoalkyl substituted mono-olefin, in which the isoalkyl carbon atoms are separated by not less than 3 carbon atoms, with formic acid in the presence of concentrated sulphuric acid or with carbon monoxide in the presence of a mineral or Lewis acid. To obtain the olefin starting material for the process of application.

Ser. No. 835,778 may often be expensive. It is desirable therefore to obtain as high a yield as possible of the desired di-neo acid based on the di-isoalkyl olefin starting material. Olefins whose structure is such as to give a mono-neo acid when reacted with for example carbon monoxide and a Brønsted or Lewis acid are often readily available. Such mono-neo acid precursors may for example be found in crude products containing the di-isoalkyl olefins which are the precursors of the di-neo acids. It would be desirable if it were possible in some way to use these mono-neo acid precursors to increase the yield of di-neo acid. It would seem however that they would merely react with the carbon monoxide and form mono-neo acids. The reference to the production of di-neo acids in U.S. Pat. 2,864,858 indicates that conditions causing olefin to react with CO to any appreciable extent should be avoided. Such conditions can hardly be avoided however where the principal reactant is itself an olefin. It may also be possible to obtain α,ω- diisoalkyl substituted mono-olefins which either do not give any appreciable yield of di-neo acids e.g. because less than 3 carbon atoms separate the diisoalkyl groups, or react to give di-neo acids much less readily than one of the preferred α,ω-diisoalkyl olefin feedstocks, and it would be desirable if these olefins could be used in some way to increase the production of di-neo acid from more reactive α,ω-diisoalkyl olefin feedstocks without requiring any substantial change in reaction conditions. Where a α,ω-diisoalkyl olefin is reacted to give a di-neo acid in the presence of a much less reactive α,ω-diisoalkyl olefin it might be expected that there would be no substantial contribution to the production of di-neo-acid as in the time required for the production of the di-neo acid from the more-reactive olefin little of the less reactive olefin would have reacted.

Accordingly the present invention is a process for the production of a di-neo carboxylic acid by reacting an olefin with formic acid or with carbon monoxide in the presence of a catalyst which is a mineral or Lewis acid, wherein the olefin is an α,ω-di-isoalkyl substituted mono-olefin in which the iso-alkyl groups are separated by not less than 3 carbon atoms, in which a sacrificial olefin is included in the reaction mixture.

The sacrificial olefin is an olefin, other than the α,ω-di-isoalkyl substituted mono-olefin from which the desired di-neo-acid is obtained, which plays a sacrificial role in the reaction by giving increased production of the di-neo acid. The α,ω-di-isoalkyl olefin which gives rise to the desired olefin is hereinafter referred to as the "specified olefin."

The sacrificial olefin preferably contains from 4–20 carbon atoms and should desirably be an acyclic mono-olefin having a branch skeleton such as types I, II or III.

$$-\underset{H}{\underset{|}{C}}-C=C\diagdown\underset{H}{\overset{H}{\diagup}} \qquad -\underset{H}{\underset{|}{C}}-\underset{H}{\underset{|}{C}}=C-\underset{C}{\underset{|}{C}} \qquad \underset{C}{\underset{|}{C}}=\underset{C}{\underset{|}{C}}$$

(I)          (II)          (III)

The sacrificial olefin may have the following configurations IV or V at the double bond $$-\underset{H}{\underset{|}{C}}-C=C\diagdown\underset{H}{\overset{H}{\diagup}} \qquad -\underset{H}{\underset{|}{C}}-\underset{H}{\underset{|}{C}}=\underset{H}{\underset{|}{C}}-C$$

(IV)          (V)

and in these cases the molecule should desirably also contain a group VI, VII or VIII with 1 or more of the following configurations.

$$-\underset{H}{\underset{|}{C}}-C \qquad C-\underset{C}{\underset{|}{C}}-C \qquad C-\underset{|}{C}-(CH_2)_n-\underset{|}{C}-C$$

(VI)     (VII)          (VIII)

where $n$ is zero or an integer from 1 to 11.

Where the sacrificial olefin contains the structure VIII it must, if it is to perform a sacrificial role, react substantially more slowly with CO or formic acid than the specified olefin. Thus the sacrificial olefin if it has the structure VIII preferably has less than 4 carbon atoms separating the α and ω carbon atoms or has terminal or sub-terminal double bonds.

It is preferred that the molar ratio of sacrificial olefin to specified olefin shall be in the range 1:1–1:10.

It is preferred that the specified olefin shall not have the double bond in a terminal or a sub-terminal position. Each alkyl group in the di-isoalkyl group of the specified olefin may be any alkyl group containing from 1 to 9 carbon atoms. The specified olefin preferably contains between 9 and 20 carbon atoms and the preferred specified olefin is 2.7-dimethyloctene-4.

2,7-dimethyloctene-4 is suitably prepared by the dismutation of 4-methylpentene-1 which is carried out using $Re_2O_7$/alumina catalyst under the conditions disclosed in British Pat. 1,054,864. 4-methylpentene-1 is suitably prepared by the dimerisation of propylene as disclosed in British Pat. 933,253. By-products present in the 2,7-dimethyloctene-4 produced by these reactions include 4-methylpentene-1; 4-methylpentene-2; 2-methylhexene-3; 2,5-dimethylhexene-3; 2,6-dimethylheptene-3 and 2-methylnonene-4. Accordingly, when using 2,7-dimethyloctene as the specified olefin any or all of these compounds which are present with the 2,7-dimethyloctene-4 may be included in the reaction mixture as the sacrificial olefin. In any event, it is preferred that the sacrificial olefin is mixed with the specified olefin before being admitted to the reaction mixture.

The olefins may be added to the reaction mixture in solution. Preferred solvents are tetrachloroethylene, carbon tetrachloride or paraffins.

The catalyst used may be a mineral Brønsted, or Lewis acid. Examples of Brønsted acids which may be used with carbon monoxide are phosphoric, hydrofluoric or sulphuric acid. Examples of Lewis acids which may be used with carbon monoxide are boron trifluoride, and its complexes with mineral acids and/or water, or mixtures of pentafluoroantimonate and hydrofluoric acid. Examples of acids which may be used with formic acid are hydrofluoric and fluosulphonic acids. The preferred acid whether using formic acid or carbon monoxide is concentrated sulphuric acid. The preferred concentration is 90% to 100% wt./wt. Somewhat more dilute sulphuric acid is preferable when using carbon monoxide than when using formic acid, and it may even be found advantageous with carbon monoxide, to use sulphuric acid having a concentration down to 85% wt./wt. It is particularly preferred to use sulphuric acid having a concentration in the range 90 to 97% wt./wt. with carbon monoxide. With formic acid it is particularly preferred to use sulphuric acid having a concentration in the range 97% wt./wt. to 100% wt./wt. It is preferred to feed to the reaction not less than 1 mole of sulphuric acid per mole of total olefin fed (i.e. specified+sacrificial olefin), more preferably 4 to 10 moles of sulphuric acid per mole of total olefin fed when using either carbon monoxide or formic acid. It may however be convenient to use 3 to 6 moles of sulphuric acid per mole of total olefin when using formic acid.

The reaction temperature may vary over a moderately wide range. When using carbon monoxide, examples of temperatures which may be used are those up to 50° C. With formic acid the upper temperature limit is preferably lower e.g. 40° C. The lower temperature limit when using carbon monoxide or formic acid is preferably not less than 0° C. Preferred temperatures when using either formic acid or carbon monoxide are those in the range 5° C. to 35° C., preferably 10° C. to 25° C. for formic acid, and above 15° C. for carbon monoxide.

When using carbon monoxide, the carbon monoxide pressure is preferably in the range 10 to 100 atmospheres, a pressure of 25 to 50 atmospheres being particularly preferred. When using formic acid, the pressure is preferably atmospheric. When formic acid is a reactant it is preferred to feed more than 1 mole of formic acid per mole of total olefin fed. It is particularly preferred to use up to 2 moles of formic acid per mole of total olefin fed.

The reaction time may vary over a moderately wide range. The duration of the reaction is most desirably greater than 1 hour, preferably between 3 and 10 hours, the duration of the reaction being the residence time for continuous operation, and the time over which olefin is added to the reaction mixture for a batch reaction.

The di-neo acid product may be received from the reaction product by dilution with water.

Together with the di-neo acid product there is also produced some mono-neo acid co-product. For example when 2.7-dimethyloctene-4 is reacted to produce 2,2,7,7-tetramethylsuberic acid some 2,2,7-trimethyloctanoic acid is also produced. Where the olefin is being reacted with carbon monoxide the mono-neo acid co-product may be recycled to the reaction of the olefin and the carbon monoxide. Alternatively the mono-neo acid may be mixed with fresh catalyst preferably at a temperature below 40° C. e.g. ambient temperature and allowed to stand for not less than 1 hour, preferably 6 to 24 hours, before the catalyst is brought into contact with the olefin and carbon monoxide or formic acid.

The invention is illustrated by the following examples in which TMS is an abbreviation for 2,2,7,7-tetramethyl suberic acid, TMO is an abbreviation for 2,2,7-trimethyloctanoic acid, and DMO is an abbreviation for 2,7-dimethyloctene-4.

EXAMPLE 1

Batchwise reactions based on carbon monoxide

An olefin feed mixture (1 mol) consisting mainly of 2,7 - dimethyloctene - 4 (82.7% w./w.), 2,6 - dimethylheptene-3 (5.7%), 2-methylhexene-3 (5.2%), 2-methylnonene-4 (3.6%) in tetrachloroethylene (100 ml.) was fed over 4 h. at 10° to 29° C. to a stirred autoclave (2 l.) which contained 97% w./w. $H_2SO_4$ (8 mol) under a pressure (515 p.s.i.g.) of carbon monoxide. The pressure was then reduced to 0 p.s.i.g. and the mixture was stirred for a further 3 h. at ca. 25° C. The reaction product was quenched with ice (800 g.) and the precipitated 2,2,7,7-tetramethylsuberic acid (0.392 mol) was separated by filtration. Mono-neo-acids (0.146 mol) mainly 2,2,7-trimethyloctanoic acid were recovered from the mother liquors by phase separation. The TMS recovered corresponded to a selectivity of 98.4% (this figure includes a small amount of TMS present in the TMS mother liquor acids) on the actual DMO fed.

EXAMPLE A

When the experiment described in Example 1 was repeated with pure DMO (1 mol) the reaction product consisted of precipitated TMS (0.393 mol) and mono-neo-acids (0.176 mol). The TMS produced corresponded to a selectivity of 82% on the actual DMO fed.

EXAMPLE 2

Batchwise reactions based on formic acid (a) An olefin feed mixture (1 mol) which consisted of DMO (0.86 mol) and 2-methylnonene-4 (0.14 mol) in tetrachloroethylene (100 ml.) was added, together with 99% w./w. formic acid (1.5 mol) to a stirred (750 r.p.m.) round bottom flask (1 l.) which contained 99% w./w. $H_2SO_4$ (4 mol) over 4 h. at 0° to 12° C. The reaction products were separated as described above after quenching in ice (400 g.). The results are given in the table.

(b) Further experiments using the same conditions as part (a) but using other sacrificial olefin additives and in some cases slightly different temperatures are given in the attached table together with the conditions used.

EXAMPLE B

An experiment was carried out as in Example 2 but pure 2,7-dimethyloctene-4 was used. The conditions used, and the results obtained, are shown in the accompanying table. The improved yield, based on 2,7-dimethyloctene-4 when using a sacrificial olefin is clearly apparent.

TABLE

| H₂SO₄ | HCOOH | Olefin Solvent | DMO | Sacrificial¹ olefin | Reaction Time (hrs.) | Reaction Temp. (° C.) | Percent selectivity of TMS on DMO | Isolated TMS | Mother liquor acids | Total neo-acids |
|---|---|---|---|---|---|---|---|---|---|---|
| 4 | 1.5 | 1 | 0.86 | 0.14, 2MN4 | 4 | 0–12 | 76 | 30.2 | 25.3 | 55.7 |
| 4 | 1.5 | 1 | 0.715 | 0.285, 2MN4 | 4 | 0–12 | 74.2 | 24.7 | 35.9 | 60.6 |
| 4 | 1.5 | 1 | 0.715 | 0.285, 4MP1 | 4 | 0–15 | 80.2 | 25.7 | 29 | 54.7 |
| 4 | 1.5 | 1 | 0.797 | 0.2 3, mixture | 4 | 0–14 | 85.3 | 24.4 | 33.1 | 57.5 |
| 4 | 1.5 | 1 | 1.0 | None | 4 | 3–13 | 72.4 | 34.2 | 17.8 | 52 |

¹ 2MN4=2-methylnonene-4; 4MPI=4-methylpentene-1; Mixture=2,6-dimethylheptene-3, 2-methylhexene-3, 2-methylnonene-4 and 4-methylpentene-1.

I claim:

1. A process for the production of a di-neo carboxylic acid by reacting an α,ω-diisoalkyl substituted mono-olefin of 9 to 20 carbon atoms in which the isoalkyl groups each have from 1 to 9 carbon atoms and are separated by not less than 3 carbon atoms, with formic acid or with carbon monoxide in the presence of a catalyst which is a mineral or Lewis acid, wherein from 1 to 0.1 mole of a sacrificial mono-olefin of 4 to 20 carbon atoms is included in the reaction mixture, said sacrificial olefin (a) being an olefin which is not itself converted to said di-neo carboxylic acid under the conditions of the process and (b) having either (i) a branched skeleton at the olefinic bond selected from the group consisting of

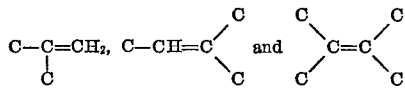

or (ii) an unbranched skeleton at the olefinic bond selected from the group consisting of CCH=CH₂ and C—CH=CH—C together with one or more branched skeletons on a monoolefinic carbon atom selected from the group consisting of

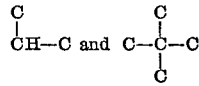

2. The process according to claim 1 wherein the α,ω-di-isoalkyl substituted mono-olefin has the double bond in a non-terminal or non-sub-terminal position.

3. The process according to claim 1 wherein the α,ω-di-isoalkyl substituted mono-olefin is 2,7-dimethyloctene-4.

4. The process according to claim 3 wherein the sacrificial olefin is 4-methylpentene-1; 4-methylpentene-2; 2-methylhexene-3; 2,5-dimethylhexene-3; 2,6-dimethylheptene-3; 2-methylnonene-4, or mixtures of these olefins.

5. The process according to claim 1 wherein the sacrificial olefin is mixed with the α,ω-di-isoalkyl substituted mono-olefin before the olefins are admitted to the reaction mixture.

6. The process according to claim 1 wherein the α,ω-di-isoalkyl substituted mono-olefin is reacted with formic acid or carbon monoxide in the presence of a Brønsted acid.

7. The process according to claim 6 wherein the Brønsted acid is concentrated sulphuric acid.

8. The process according to claim 7 wherein the sulphuric acid has a concentration in the range 90–100% wt./wt.

9. The process according to claim 7 wherein carbon monoxide is a reactant and the sulphuric acid has a concentration of 85% to 100% wt./wt.

10. The process according to claim 8 wherein formic acid is a reactant and the sulphuric acid has a concentration in the range 97% to 100% wt./wt.

11. The process according to claim 1 wherein the reaction temperature is in the range 5° of 35° C.

12. The process according to claim 1 wherein carbon monoxide is a reactant and the reaction is carried out at a carbon monoxide pressure of 10 to 100 atmospheres.

13. The process according to claim 7 wherein not less than 1 mole of sulphuric acid is fed to the reaction per mole of total olefin fed.

14. The process according to claim 13 wherein 4 to 10 moles of sulphuric acid is fed to the reaction per mole of total olefin fed.

15. The process according to claim 1 wherein more than 1 mole of formic acid is fed to the reaction per mole of total olefin fed.

16. The process according to claim 1 wherein co-produced mono-neo acid is mixed with fresh catalyst and allowed to stand at below 40° C. for not less than an hour to rearrange the mono-neo acid to di-neo acid, and then brought into contact with olefin, and carbon monoxide or formic acid.

17. The process according to claim 1 wherein co-produced mono-neo acid is recycled direct to the reaction of the olefin with carbon monoxide.

References Cited
UNITED STATES PATENTS
3,609,185   9/1971   Yeomans et al. _____ 260—533 A LORRAINE A. WEINBERGER, Primary Examiner R. D. KELLY, Assistant Examiner U.S. Cl. X.R.
260—533 A